2,935,382

PRODUCTION OF HYDROGEN

Oliver Osborn and Richard P. George, Lake Jackson, Tex., assignors to The Dow Chemical Company, Midland, Mich., a corporation of Delaware No Drawing. Application February 24, 1959
Serial No. 794,862

5 Claims. (Cl. 23—211)

This invention relates to the production of hydrogen. More particularly, it relates to a method for the production of hydrogen by the reaction of magnesium hydride with water and a composition for the use therein.

A large quantity of hydrogen gas is often required at remote and relatively inaccessible sites. The transportation of the hydrogen to these sites in heavy cylinders is expensive. The hydrogen may be supplied at a substantial saving by generation of the hydrogen at the site. Since water is generally available at the site, the reaction of magnesium hydride with water may be conveniently employed to generate the hydrogen.

While magnesium hydride in extremely fine particle size, i.e. micron size, may react vigorously with water to evolve hydrogen, magnesium hydride in a larger particle size, for example in the range of 100 to 325 mesh, reacts with water at such a slow rate that it is impractical to use it in hydrogen production. The availability of mangesium hydride in micron particle size is limited. It may be obtained in the micron particle size by pyrolysis of magnesium dialkyl, such as magnesium diethyl, but it is an expensive way to prepare magnesium hydride. The most economical method for the preparation of magnesium hydride is by the reaction of magnesium with hydrogen at elevated temperatures. The finest magnesium hydride produced by the reaction of magnesium with hydrogen generally has a particle size of 100 to 325 mesh. To obtain a finer product, it is usually necessary to grind the magnesium hydride which is costly and time consuming. It would be greatly desirable to be able to use the magnesium hydride obtained by direct reaction of magnesium with hydrogen without having to grind it.

It is, therefore, an object of this invention to provide a process for the preparation of hydrogen wherein magnesium hydride having a particle size in the range of 100 to 325 mesh may be used in the reaction with water for hydrogen generation.

The above and other objects are attained according to the invention by intermixing magnesium hydride having a particle size in the range of 100 to 325 mesh with water in the presence of magnesium chloride to react the magnesium hydride with the water to form the hydrogen. The hydrogen evolved by the reaction is recovered by known means. In the presence of magnesium chloride, magnesium hydride in the relatively coarse particle size will react rapidly with water evolving hydrogen.

The term "100 to 325 mesh," as used herein, means that the magnesium hydride product is of a particle size such that it will pass through a 100 mesh Tyler Standard Screen and be retained on a 325 mesh Tyler Standard Screen.

It is immaterial whether magnesium chloride is intermixed with the magnesium hydride prior to contacting with water or dissolved in the water with which the magnesium hydride is contacted. It is generally preferred to intermix the magnesium hydride with the magnesium chloride in the desired proportions. The mixture of magnesium chloride and magnesium hydride may be thus safely handled and stored until the need for hydrogen arises. It may even be compressed in pellet or block form to aid in the handling and storage. It can then be transported to the site desired and hydrogen generated by contacting the mixture with water in one of the various known hydrogen generators. Fresh water or sea water may be used. The amount of water used is not critical as long as a stoichiometric amount is employed. Generally a large excess of from 2 to 10 times the required amount is used.

Although as little as 1 weight percent of magnesium chloride will increase the rate of reaction of magnesium hydride with water, generally at least 10 weight percent of magnesium chloride is employed. The amount of magnesium chloride in the magnesium hydride-magnesium chloride mixture may be advantageously increased to about 20 weight percent after which further additions of magnesium chloride up to about 45 weight percent will result in only a gradual further increase in rate of reaction. Above 45 weight percent no appreciable advantage is gained by further increasing the magnesium chloride concentration. Optimum results are ordinarilly obtained with a mixture of magnesium hydride and magnesium chloride containing from 20 to 30 weight percent of magnesium chloride.

The reaction of magnesium hydride with water is usually initiated at about room temperature. The reaction is exothermic so that the temperature of the reacting mass may increase as the reaction proceeds. Since the rate of reaction is more rapid at a higher temperature, it may be advantageous at times to heat the reacting mixture to carry out the reaction at a temperature of from 40° to 80° C. or even higher when the reaction is carried out at pressures above atmospheric. In most instances the hydrogen may be supplied at about atmospheric pressure. However, at times it may be desirable to have the hydrogen at a higher pressure. In these cases, the reaction is carried out under an increased pressure to produce the hydrogen at the desired pressure.

The following example further illustrates the invention but is not to be construed as limiting it thereto.

*Example I*

To 10 grams of water in a flask, a mixture containing 1.60 grams of magnesium hydride and 0.75 gram of magnesium chloride was added. The magnesium hydride had a particle size such that it passed through a 200 mesh Tyler Standard Screen and was retained on a 250 mesh Tyler Standard Screen. The magnesium hydride and magnesium chloride mixture were contacted with the water at room temperature (22° C.) and as the reaction proceeded the temperature of the mixture was allowed to increase. The hydrogen generated by the reaction was collected in a gas bottle by displacement of water. Within 18.5 minutes after intermixing the magnesium hydride and magnesium chloride mixture with the water, 2730 ml. of hydrogen, corrected to standard conditions of temperature and pressure, was obtained which represented approximately 95 percent of the hydrogen theoretically obtainable.

To illustrate the effect of the magnesium chloride on the reaction of magnesium hydride and water, a series of runs was made in a manner similar to that above where the amount of magnesium chloride used was varied. The magnesium hydride used was of the same particle size as above. The table below shows the results obtained and includes the run made above.

| Mixture of MgH$_2$—MgCl$_2$ | | | Percent of theoretical amount of hydrogen evolved after 18.5 minutes of reaction | Time required to substantially complete the reaction |
|---|---|---|---|---|
| MgH$_2$, gm. | MgCl$_2$, gm. | Wt. percent MgCl$_2$ | | |
| 1.6 | 0.75 | 32 | 95 | |
| 1.6 | 0.40 | 20 | 86 | 30. |
| 1.6 | 0.08 | 5 | 1 | 150. |
| 1.6 | none | 0 | 0 | 1% H$_2$ evolved after 150 minutes. |

What is claimed is:

1. A process for the preparation of hydrogen, which comprises intermixing magnesium hydride having a particle size in the range of 100 to 325 mesh with water in the presence of magnesium chloride to react the magnesium hydride with water to form the hydrogen and recovering the hydrogen.

2. A process for the preparation of hydrogen, which comprises intermixing magnesium hydride having a particle size in the range of 100 to 325 mesh with magnesium chloride to obtain a mixture of magnesium hydride and magnesium chloride containing from 1 to 45 weight percent of magnesium chloride, contacting the resulting mixture with water to react the magnesium hydride with water to form hydrogen, and recovering hydrogen.

3. A process according to claim 2 wherein the magnesium hydride and magnesium chloride mixture contains from 20 to 30 weight percent of magnesium chloride.

4. A process according to claim 3 wherein the magnesium hydride and magnesium chloride mixture is contacted with water at a temperature in the range of 40° to 80° C.

5. A composition of matter consisting essentially of a mixture of magnesium hydride having a particle size in the range of 100 to 325 mesh and from 1 to 45 weight percent of magnesium chloride.

References Cited in the file of this patent

Hurd: Chemistry of the Hydrides, pages 49, 51, 52, John Wiley & Sons, New York, 1952.